Sept. 10, 1968                H. LIST                3,400,577
DEVICE FOR THE MEASUREMENT OF THE CONSUMPTION OF LIQUIDS
Filed Jan. 27, 1966
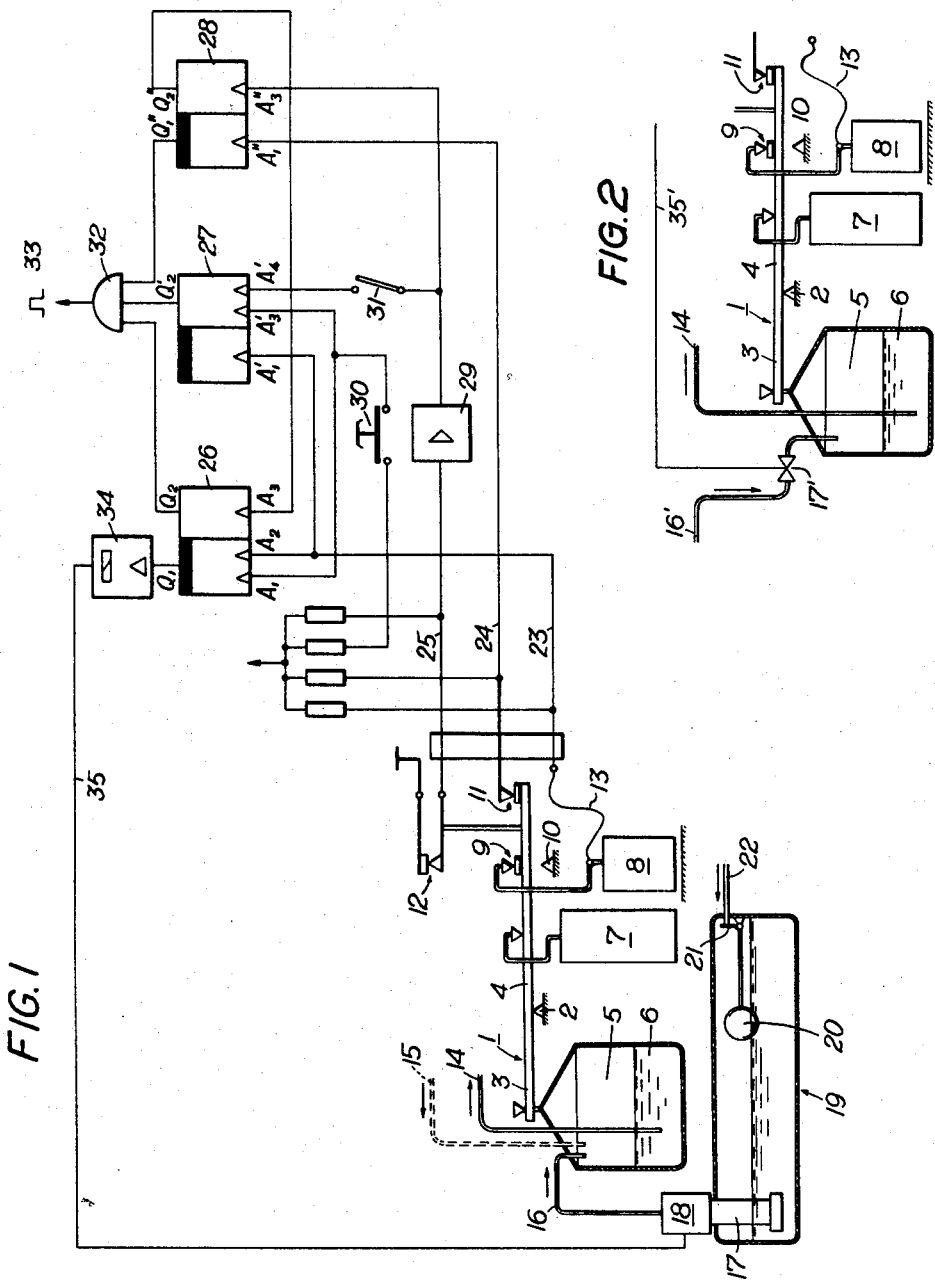
Inventor
Hans List
By
Watson, Cole, Grindle & Watson
Attys.

United States Patent Office 3,400,577
Patented Sept. 10, 1968

3,400,577
DEVICE FOR THE MEASUREMENT OF THE
CONSUMPTION OF LIQUIDS
Hans List, 126 Heinrichstrasse, Graz, Austria
Filed Jan. 27, 1966, Ser. No. 523,305
Claims priority, application Austria, Feb. 2, 1965,
A 922/65
3 Claims. (Cl. 73—113)

ABSTRACT OF THE DISCLOSURE

An installation for the measurement of the consumption of liquids as a fuel for an internal combustion engine having a balance with a measuring bowl and counterpoises all mounted on a balance beam. The beam is connected to an electronic control system including a plurality of bistable switch steps.

---

The invention relates to a device for the measurement of liquids, in particular of the fuel consumption of an internal combustion engine, comprising a measuring bowl containing the liquid and attached to one leg of a balance beam and two counterpoises and electric contacts for the control of indicator gauges and/or measuring instruments on the other leg of the balance beam, provision being made for one of the counterpoises corresponding to the amount of liquid to be measured to be detached from the said balance beam and placed upon a fixed support if required, the said counterpoise forming a control switch in conjunction with one of the control contacts of the balance beam. Devices of this kind are suitable not only for the determination of the specific fuel consumption of internal combustion engines, but for example, also for the measurement of the consumption of oil burners, for the determination of the output of pumps, particularly of injection pumps for internal combustion engines and for similar purposes.

A conventional device of this kind comprises a cantilevered pipe terminating in the measuring bowl and connected, with the interposition of a solenoid valve by means of a connecting line with the user, for example with an internal combustion engine on the one hand, and by means of a feeder line with the interposition of another solenoid valve, with the tank. For the control of the delivery of liquid to and of the discharge from the measuring bowl the two solenoid valves are controlled by means of relays actuated by the control contacts of the balance beam. A drawback inherent in this conventional device resides in the fact that in normal operation, and consequently also shortly before the switchover to the measuring phase, the consumer is subject to a preliminary liquid pressure which is greater than the one prevailing during the measurement, since the liquid level in the tank from which the consumer is being fed in normal operation, must at any rate be higher than the level in the measuring bowl so as to permit its refilling upon completion of the measuring operation. In addition, solenoid valves are comparatively expensive so that the cost of this equipment is relatively high, particularly with systems providing for the return of the liquid and requiring four solenoid valves. Moreover, the use of a plurality of solenoid valves entails a certain degree of instability of measurements due to the fact that solenoid valves are liable to leak; also, the permanent care and control of solenoid valves is both cumbersome and time-consuming.

It is the purpose of the present invention to eliminate the drawbacks and shortcomings of the conventional device. According to the invention, all of the avoidable sources of trouble likely to influence the results of measurements are to be eliminated by providing for the delivery of the entire liquid supply to the consumer by means of the measuring bowl. According to the invention, this is to be achieved by the provision of a feed pipe for the consumer emerging from the measuring bowl and of a device for the refilling of the measuring bowl via a second pipe terminating in the measuring bowl, the said device being switched on and off by means of two control contacts of the balance beam forming control switches in conjunction with fixed contacts in the positions of the balance beam corresponding to the beginning and the end of the measuring operation, respectively. This design provides for absolutely identical operating conditions for every possible method of operation of the device since the consumer unit is at all times fed via the measuring bowl. Consequently, transition from one method of operation of the device to another, such as for example, from normal operation to the measuring operation of an internal combustion engine, is not accompanied by any change in the operational conditions of the internal combustion engine. As a result, such fluctuations of output of the internal combustion engine as might be caused by the switchover process and are liable to falsify the result of the measurement, cannot occur with the device according to the invention. As compared with the conventional design comprising a plurality of solenoid valves the design according to the invention offers the additional advantage of simplified construction and consequently, increased dependability in operation, combined with the possibility of continuously removing the liquid required for operation from the measurng bowl, and the avoidance of a reversal of flow of the liquid in the sampling tube, objectionable oscillations of the beam of the balance due to stray line pulses being largely avoided. This results in greater precision of contact making and consequently in still greater accuracy of the measurements obtained by the device.

According to a preferred embodiment of the invention the device for the refilling of the measuring bowl comprises an electrically operated pump, preferably other than the self-priming type, delivering the liquid from the intermediate container to the measuring bowl located at a higher level. This provides complete freedom for choosing the most convenient location of the balance as the same is absolutely independent from the level prevailing in the main tank. In addition, the pump ensures speedy refilling of the empty measuring bowl, thereby quickly restoring the readiness for use of the measuring instrument. This is particularly convenient in the case of continuous measurements of the liquid consumption since long intervals between successive measuring operations are thereby avoided. The above recommendation not to use a self-priming pump is based on the fact that with a pump which is not of the self-priming variety the liquid remaining in the feed pipe leading to the measuring bowl is removed by suction when the pump is switched off, thereby avoiding the objectionable dripping of liquid into the measuring bowl.

According to another feature of the invention providing for the use of a pump for the refilling of the measuring bowl it is particularly convenient to maintain a constant level for the liquid in the intermediate tank, for example by means of a float valve, as a result of which the delivery head of the pump fed from the intermediate tank and consequently, its specific delivery will stay permanently constant.

According to a further simplified embodiment of the invention, the device for the refilling of the measuring bowl comprises a feed pipe controlled by means of a solenoid valve and delivering the liquid from a tank to the measuring bowl located on a lower level. The inherent advantage of this design resides in its very low construction expenses since reliable measuring results are obtained with a single solenoid valve. This simplified embodiment as well as the first-mentioned pump-fed variety can be operated by three different methods of operation, namely in normal operation, measuring operation and for repeated measurements.

Finally, according to another embodiment of the invention a pipeline for the returning of liquid from the consumer unit may be made to terminate in the measuring bowl, such as for the leak-oil of fuel injection engines. Consequently, there will be no need for taking these fuel losses of the consumer unit due to leakage and other imponderables into account in the usual way by separate empirical determination, since their influence on the result of the measurements has been completely eliminated by the return of lost liquid to the measuring bowl.

Further details and features of the invention will be hereafter described with reference to the accompanying drawing in which FIG. 1 schematically illustrates a preferred embodiment and FIG. 2 a simplified embodiment of the invention.

The device comprises a balance beam 1 supported by a fixed knife-edge bearing 2. At the end of the leg 3 of the grounded beam 1 a measuring bowl 5 is suspended by means of a knife edge, the said bowl containing the liquid for the consumer unit (not shown) associated with the device. The other leg 4 of the beam 1 carries counterpoises 7 and 8 also suspended by means of knife-edges, the counterpoise 7 serving to compensate the weight of the measuring bowl 5 and the counterpoise 8 corresponding to the weight of the amount of liquid to be measured. The counterpoise 8 is designed as a function of the beam 1, as illustrated in a simplified manner by means of a horizontal bearing surface beneath the counterpoise 8 in the drawing, At the extremity of the leg 4 of the balance beam 1 two control contacts are provided, one of which forms a switch 9 in conjunction with the knife-edge of the counterpoise 8 and the other forms a switch 11 in conjunction with a fixed contact. The leg 4 actuates an additional switch 12 by means of an intermediate lever. The switching arrangement provides for the successive opening of the circuits by the switches 12 and 11 when the leg 4 of the balance beam 1 descends, and for the opening of the circuit by the switch 9 as soon as the counterpoise 8 abuts against its fixed support. In its bottommost end position the leg 4 of the balance beam 1 rests on a fixed support 10. A flexible connecting line 13 serves as a connection for the switch 9.

A pipe 14 leading to the consumer unit as for example, an internal combustion engine, and possibly a return pipe 15 such as for example, an overflow-oil line emerging from the consumer unit, as well as a feeder 16 for the refilling of the measuring bowl 5 extend from above into the measuring bowl 5. The liquid is delivered through the feeder 16 by means of a pump 17 driven by an electric motor 18 and inserted in an intermediate tank 19 located on a lower level as compared with the measuring bowl 5. Any pump 17 other than one of the self-priming type recommends itself for that purpose. The liquid in the intermediate tank 19 is maintained on a constant level by means of a float member 20 regulating the supply of liquid by means of a feeder 22 originating with the main tank by means of a float valve 21.

By means of pilot wires 23, 24 and 25 the switches 9, 11 and 12 are connected with an electronic control system essentially comprising three bistable switch steps 26, 27 and 28. Via their respective resistors the pilot wires 23 to 25 are connected with the feed voltage $U_B$.

The pilot wire 23 connects the switch 9 via the flexible line 13 both with the left-hand input A2 of the bistable switch step 26 and with the left-hand input A1 of the bistable step 27. The pilot wire 24 originating with the fixed contact of the switch 11 leads to the left-hand input A1″ of the third bistable switch step 28. The pilot wire 25 originating with the control switch 12 leads via a reversal stage 29 to the right-hand input A3″ of the third bistable switch step 28 on the one hand and by means of a repeat switch 31 to the right-hand input A4′ of the second bistable switch step 27 on the other hand. An additional control line connected via a resistor to the feed voltage $U_B$ with the interpolation of a starter button 30 leads to the left-hand input A1 of the first bistable switch step 26 on the one hand and to the right-hand input A3′ of the second bistable switch step 27 on the other hand. The right-hand input A3 of the first bistable switch step 26 is connected to the right-hand output Q2″ of the bistable switch step 28.

The bistable switch steps 26 to 28 control a gate 32 connected with the right-hand output Q2 of the first, the right-hand output Q2′ of the second and with the left-hand ouput Q1″ of the third bistable switch step. From the switch step 34 connected with the left-hand output Q1 of the first bistable switch step 26 a connecting line 35 leads to the motor 18 of the pump 17.

The control system according to the invention can be used for three methods of operation, namely for normal operation, for measuring operation and for repetitive measuring. In all three operational conditions the liquid is delivered to the consumer unit from the measuring bowl.

Normal operation merely involves a check on the liquid level in the measuring bowl 5 the contents of which varies alternatingly between the final conditions "empty" and "full." The individual switching operations involved are as follows: As soon as the liquid level in the measuring bowl 5 has been lowered as a result of removal of liquid by the consumer unit to the level corresponding to the "empty" condition, the descending leg 4 is lifted off the knife-edge of the counterpoise 8 by the action of the counterpoise 7, the switch 9 breaking the circuit. By means of the pilot wire 23 a control pulse is released to the input A2 of the bistable switch step 26 as well as to the input A1′ of the second bistable switch step 27. This control pulse flips the two bistable switch steps 26 and 27 into the left-hand switch position. As a result, the switch step 34 is controlled by means of the output Q1, the motor 18 of the pump 17 being switched on via the connecting line 35, the said pump refilling the measuring bowl via the feeder 16.

When the liquid level in the measuring bowl 5 has risen to the level corresponding to "full," the balance beam 1 returns to its original position, first closing the switch 11 which action remains without any effect, and finally the switch 12. The control pulse released by the switch 12 passes via the pilot wire 25 and the reversal step 29 to the right-hand output A3″ of the bistable switch step 28, placing the same in the right position. The step 28 in turn controls via its output Q2″ the right-hand input A3 of the first bistable stage 26, which is thereby flipped into the right position, so that the following switch step 34 again switches the motor 18 of the pump 17 off. These switching operations are automatically repeated. In normal operation of the system, no releasing gate pulse 33 is, however, allowed to reach the counter (not shown) following the gate 32, because the bistable switch step 27 occupies the left-hand switch position, the gate 32 thus being permanently locked.

The second method of operation of the system (measuring operation) is started by actuating the starter button 30. As a result, a control pulse is released to the left-hand input A1 of the bistable switch step 26 as well as to the right-hand input A3′ of the bistable step 27. Thus the pump 17 is started and the measuring bowl refilled via the switch step 34 irrespective to the then prevailing operating condition of the balance. As soon as the overflow level in the measuring bowl 5 has been attained and the switches 11 and 12 make the circuit, the control pulse released by the switch 12 flips the third bistable step 28 into the right-hand switch position in the same manner as hereabove described for normal operation, the said third switch step 28 in turn flipping the first bistable switch step 26 into the right position, thereby switching the pump 17 off. At this stage all of the three switch steps 26 to 28 are therefore, in the right-hand switch position. If the switch 11 breaks the circuit following the absorption of the overflow, a control pulse is released by means of the pilot wire 24 to the right-hand input A1'' of the bistable step 28 and flips the same in the left-hand switch position. Thus a gate pulse 33 is released by means of the now open gate 32 to the counter. After the amount of liquid measured has been completely consumed, the switch 9 makes the circuit as a result of which the pump 17 is restarted by means of the bistable switch step 26 on the one hand, and the gate pulse 33 disappears by means of the bistable switch step 27 and the gate 32 on the other hand. Operation of the control system now continues as in normal operation, without gate pulse 33 being released, since the switch step 27 remains in the left-hand position until such time when another measuring process is initiated by again actuating the starter button 30.

The third method of operating the control system permits the automatic continued repetition of the measuring process (repeated measuring method). With this method of operation the repeat switch 31 stays permanently closed. Thus when the switch 12 makes the circuit the bistable switch step 28 together with the bistable switch step 27 are flipped into the right-hand switch position, so that with each emptying process a gate-pulse 33 is allowed to pass by the gate 32, thereby initiating a measurement by means of the counter.

The simplified embodiment of the invention as illustrated in FIG. 2 differs from the variant shown in FIG. 1 only in respect of the elements used for the refilling of the measuring bowl 5, the pump 17 driven by an electric motor 18 being replaced by a solenoid valve 17' controlling the delivery of the liquid to the measuring bowl 5 from a container (not shown) situated on a higher level by means of a feeder 16'. In a manner similar to the connection of the pump motor 18, the solenoid valve 17' is connected with the electronic control system by means of a line 35'. Basically, the operation of this simplified variant is the same as with the first-mentioned embodiment of the invention as shown in FIG. 1.

I claim:
1. A device for the measurement of the consumption of liquids, particularly of the fuel consumption of an internal combustion engine, comprising a balance having a two-armed beam, a measuring bowl attached to one arm of the beam of the balance and containing the liquid to be consumed, a drain pipe connecting the measuring bowl with a consuming unit, a feeder emerging from a liquid tank and terminating in the measuring bowl, an electrically operated device for the control of the flow of liquid through the said feeder, a first counterpoise on the beam corresponding to the net weight of the measuring bowl, a second counterpoise on the beam corresponding to the net weight of the amount of liquid associated with each individual measuring operation in the measuring bowl, both counterpoises being suspended from the other arm of the balance beam on knife-edges, a fixed abutment below the said second counterpoise carrying the same in a lowered position of the said other arm, a first and a second electric control contact arranged on the said other arm, a third control contact mounted at the extremity of a tiltable lever connected with the said other arm of the balance beam by means of an intermediate lever, a first counter-contact co-operating with the said first control contact and arranged on the knife-edge of the said second counter-poise, a second counter-contact co-operating with the said second control contact and firmly secured above the same, a third counter-contact co-operating with the said third control contact and also firmly secured to the device, an electric control system comprising three bistable switch steps, a first control line connecting the said first counter contact with a left input of the first and second bistable switch steps respectively, a second control line connecting the said second counter-contact with the left input of the third bistable switch step, a third control line connecting the said third control contact by a reversal stage both with the right input of the said third bistable switch step and by a repeat switch with a right input of the said second bistable switch step, a fourth control line connected by means of a starter key with a left input of the first bistable switch step and a right input of the second bistable switch step, each of the said control lines being connected by an associated resistor to the feed voltage of the control device, a connecting line connecting the right input of the first bistable switch step with the right output of the third bistable switch step, a gate means having three inputs individually connected with the right output of the first bistable switch step, the right output of the second bistable switch step and the left-output of he third bistable switch step, the said gate means comprising an output for the connection of a pulse counter, a switch step connected to the left output of the said first bistable switch step, and the output of the switch step connected with the said electrically actuated device controlling the flow through the said control line.

2. A device according to claim 1, in which an electrically operated device controls the flow through the said feeder line, the said device consisting of an electrically operated feed pump having an intake protruding into the said liquid tank, the said feeder being connected to the delivery side of the said feed pump.

3. A device according to claim 1, in which an electrically operated device controls the flow through the said feeder, the said device comprising a solenoid valve inserted in the said feeder, the said liquid tank being arranged at a higher level in relation to the said measuring bowl.

References Cited
UNITED STATES PATENTS

| 1,800,640 | 4/1931 | Jehle et al. | 73—113 |
| 2,409,982 | 10/1946 | Longmate | 73—113 |
| 2,571,695 | 10/1951 | Ellison | 73—113 |
| 2,669,869 | 2/1943 | Weber | 73—113 |
| 2,672,754 | 3/1954 | Kent | 73—112 |
| 3,105,565 | 10/1963 | Pischinger | 73—113 X |

RICHARD C. QUEISSER, *Primary Examiner.*

JERRY W. MYRACLE, *Assistant Examiner.*